Sept. 21, 1926.  
C. G. HAWLEY  
1,600,762  
PROCESS OF SEPARATION AND APPARATUS THEREFOR  
Filed June 28, 1926   7 Sheets-Sheet 1
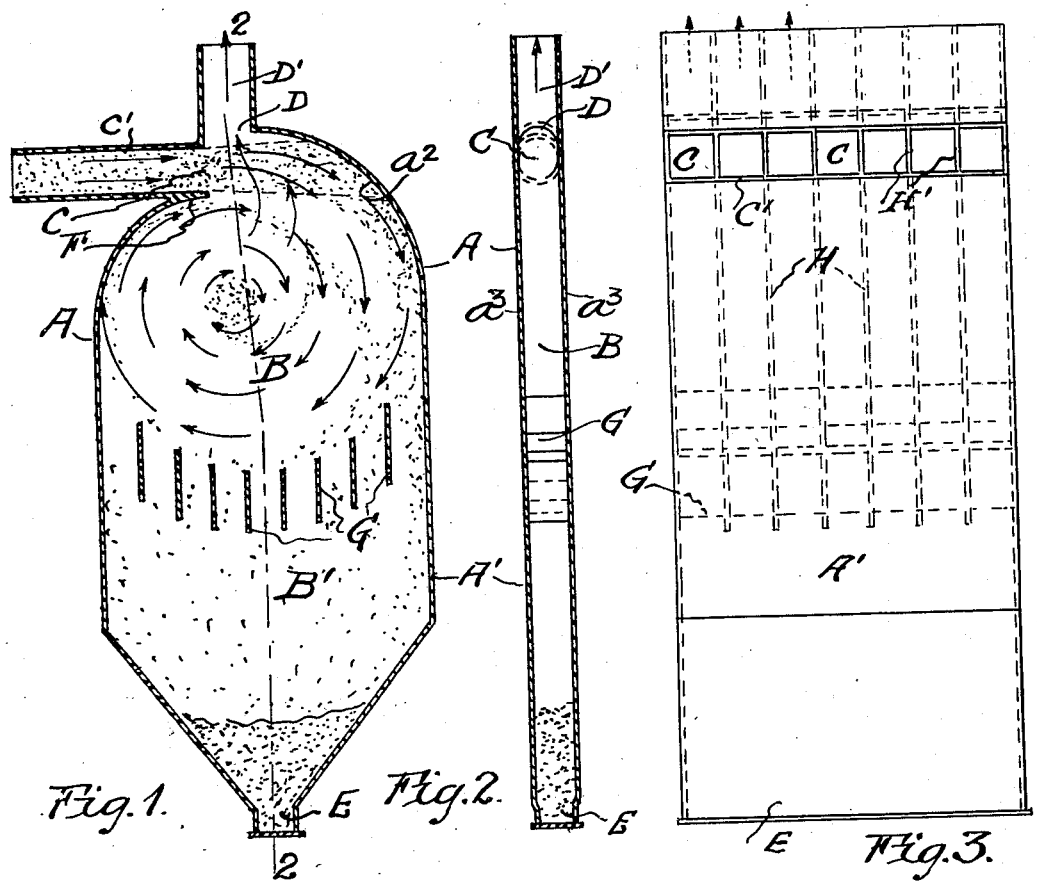
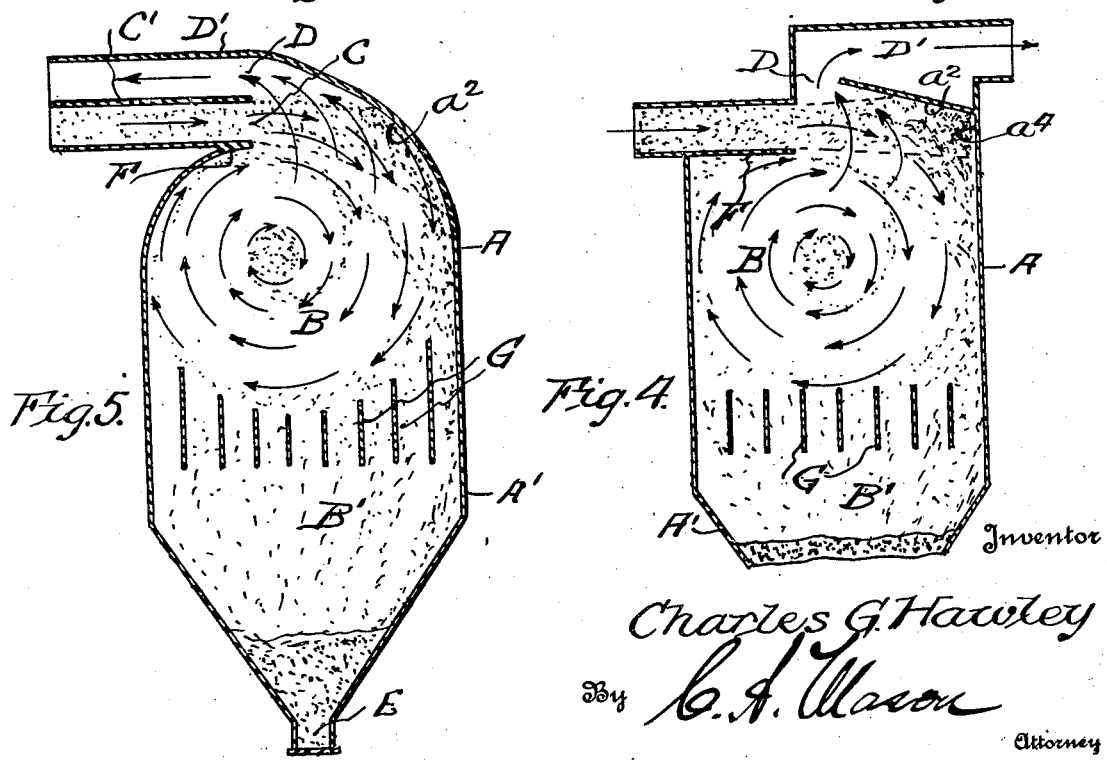
Inventor  
Charles G. Hawley  
By C. A. Mason  
Attorney

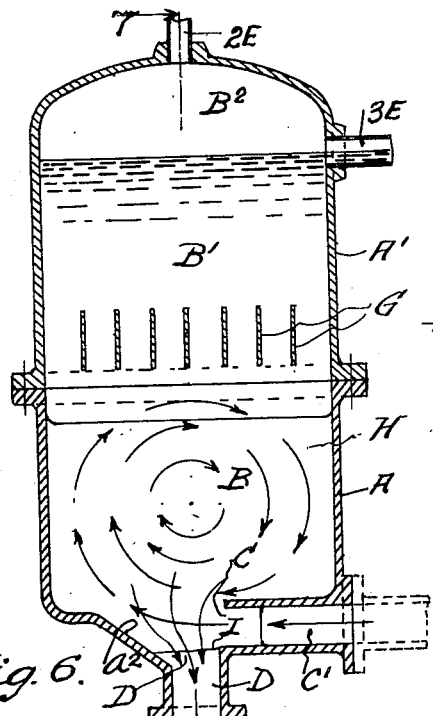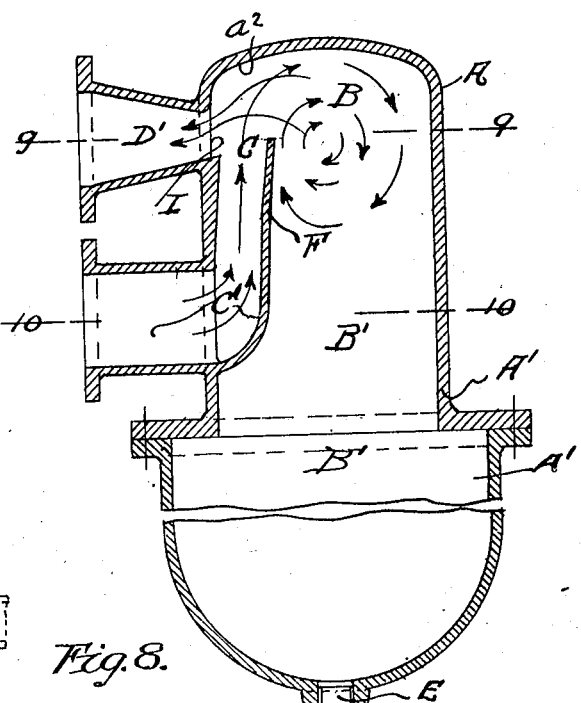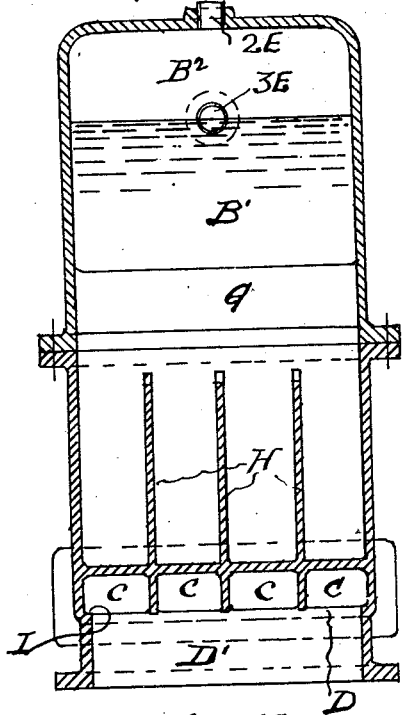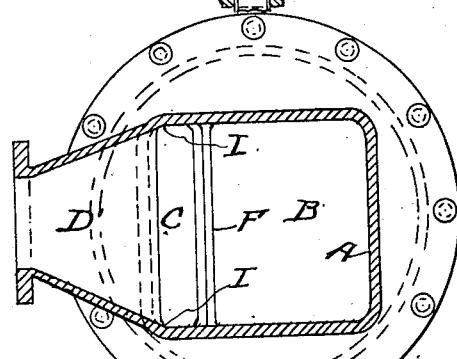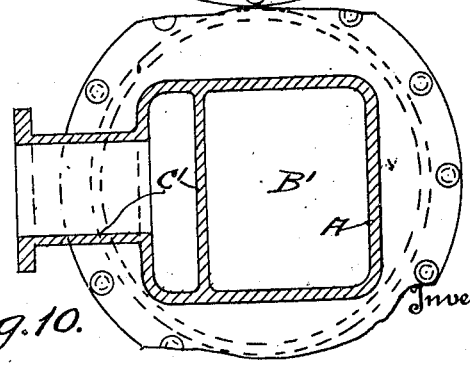

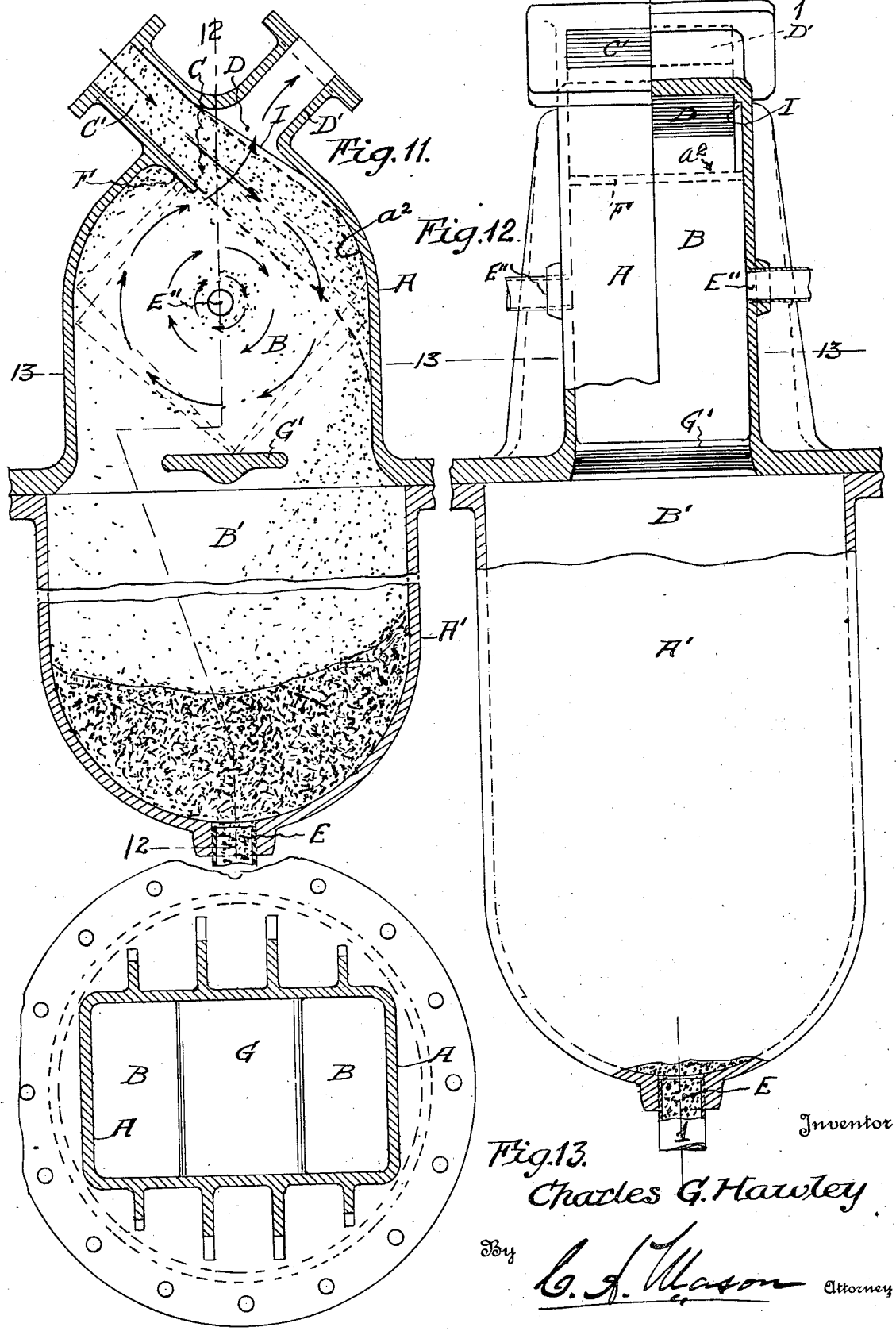

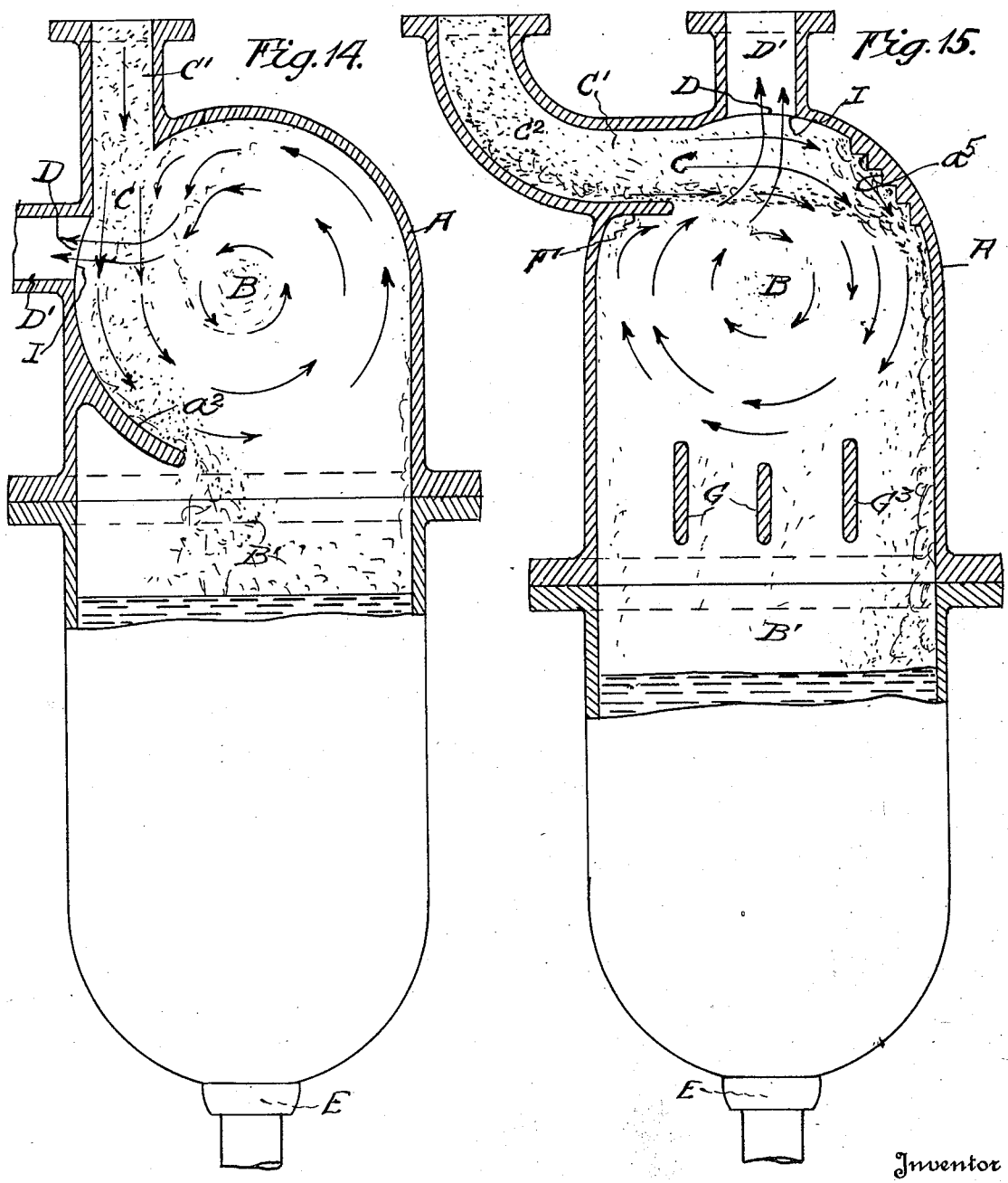

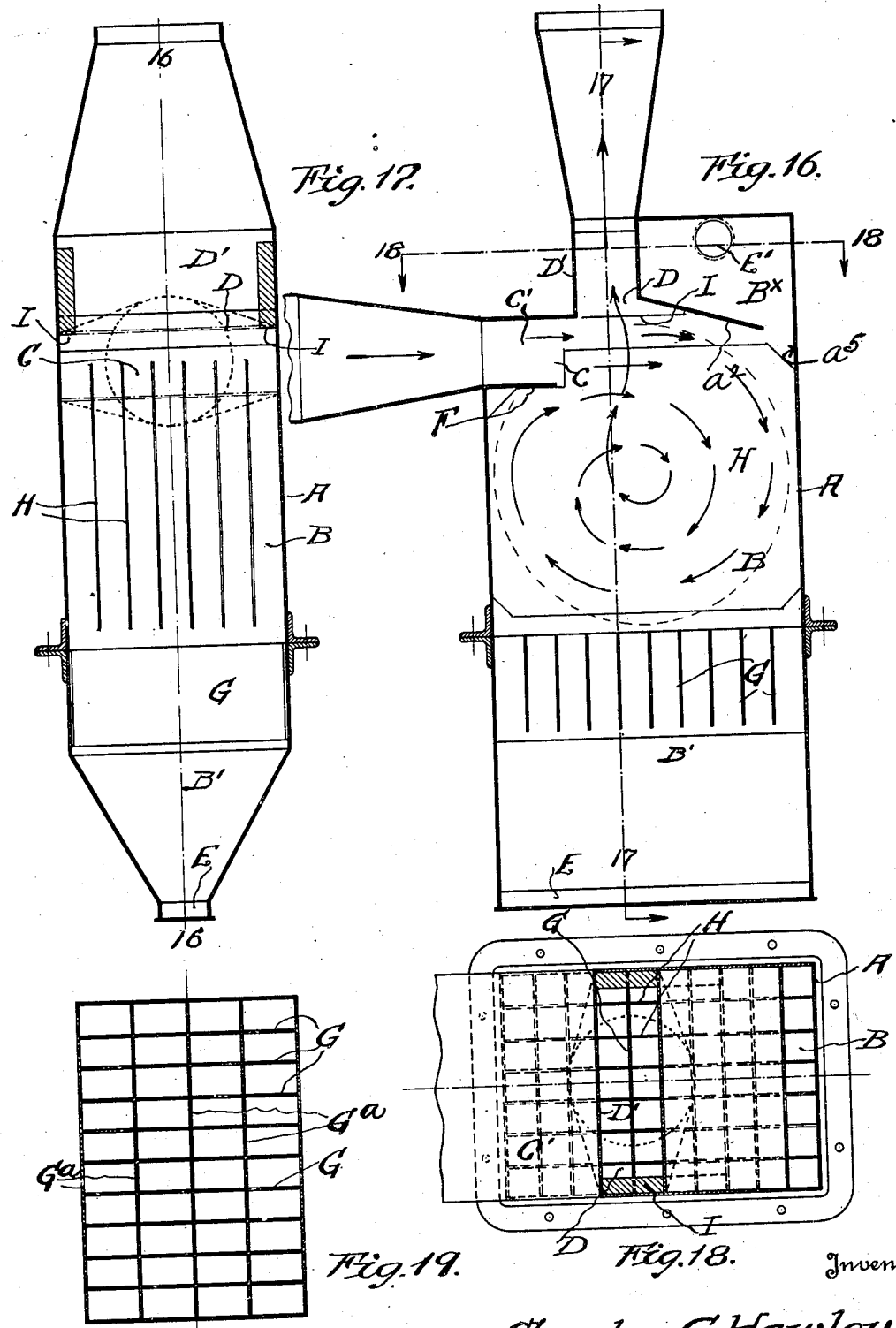

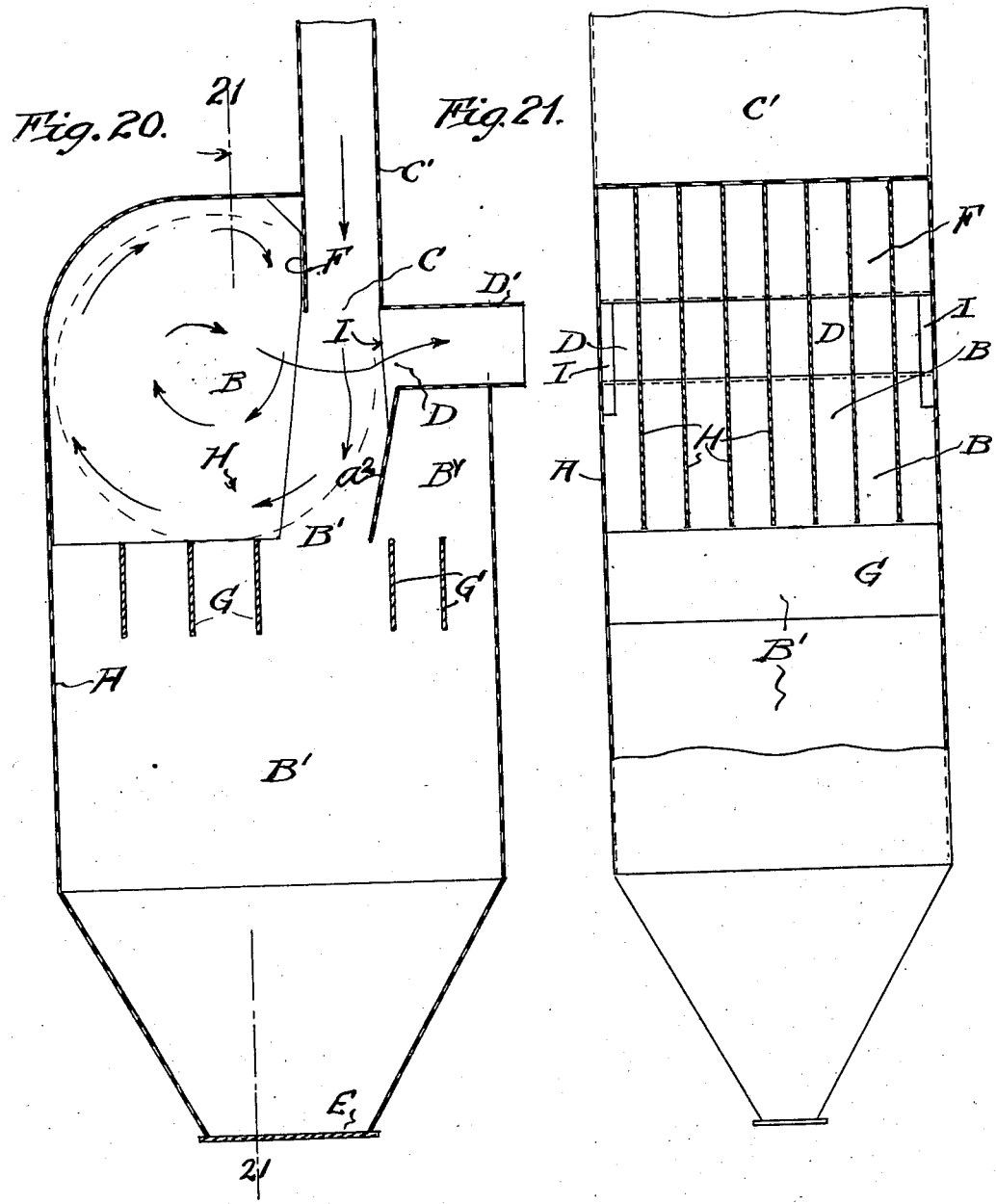

Sept. 21, 1926.
C. G. HAWLEY
1,600,762
PROCESS OF SEPARATION AND APPARATUS THEREFOR
Filed June 28, 1926     7 Sheets-Sheet 7
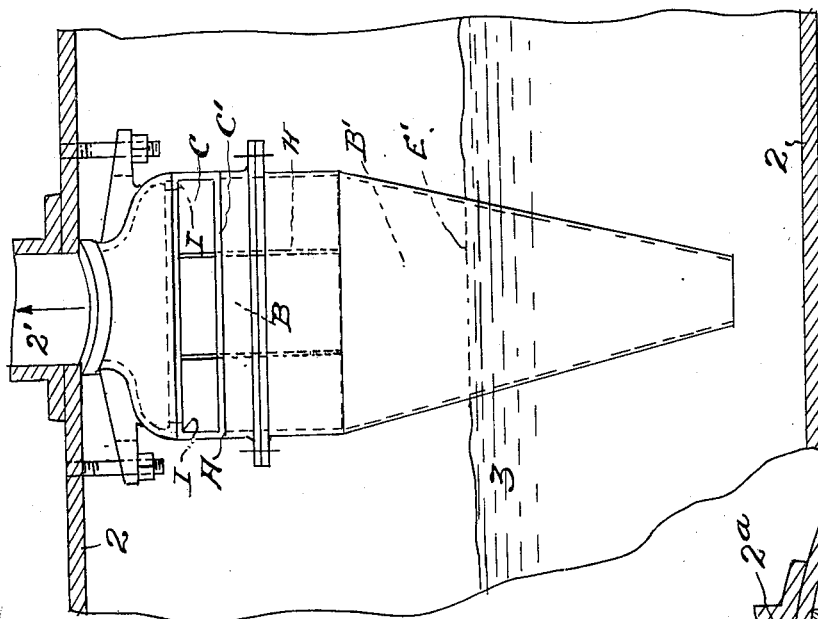
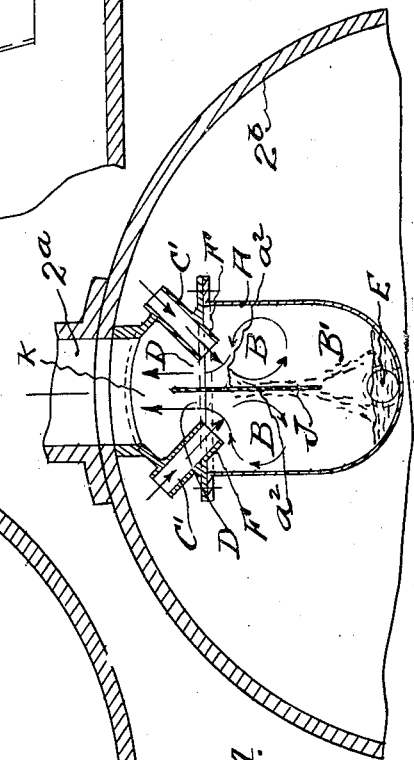
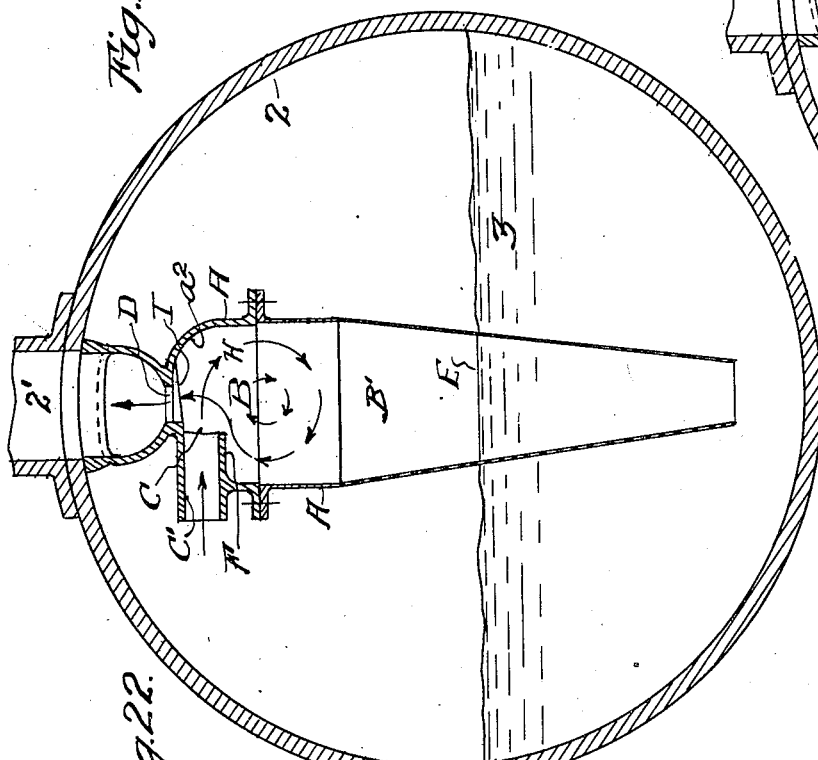
Inventor
Charles G. Hawley
By
C. H. Mason
Attorney Patented Sept. 21, 1926.

1,600,762

UNITED STATES PATENT OFFICE.

CHARLES GILBERT HAWLEY, OF CHICAGO, ILLINOIS.

PROCESS OF SEPARATION AND APPARATUS THEREFOR.

Application filed June 28, 1926. Serial No. 118,891.

This invention relates to improvements in the art of separating various substances from flowing fluids. Such flowing fluids are known as "carriers" and the term carrier is to be understood as meaning any fluid that is directed or kept in motion between given points whether liquid, gaseous or vaporous and whether hot or cold, or a mixture of such fluids; and, the terms "foreign substances" and "entrained substances" as used herein are to be understood as meaning any and all carrier conveyed substances, whether solid or fluid, or both, and whether of less or greater weight than the carrier.

The invention comprises an improved method and apparatus for best utilizing the forces of kinetic energy, centrifugal motion and gravity to separate or remove entrained substances from carrier fluids. As will presently appear, the invention is generic or fundamental in character, being capable of innumerable uses and of many different embodiments. It is not limited to a special use or class of uses; and, certain of the steps and parts of the highly perfected invention may be omitted in operations of the easier sorts.

The invention as a whole and its several steps, parts and elements will be described by reference to the accompanying drawings. Therein many forms of the novel centrifugal fixture are shown as a sure guide to the effective use of the invention.

In the drawings:—Figure 1 is a vertical transverse section of a separator or collector both illustrating and embodying the invention; Fig. 2 is a vertical section on the line 2—2 of Fig. 1; Fig. 3 is an elevation of the separator as it appears when made up of a plurality of the thin units or sections indicated in Fig. 2; Fig. 4 illustrates a desirable modification in the shape of the casing of the separator; Fig. 5 is like unto Fig. 1 but illustrates a modified form of the outlet; Fig. 6 is a vertical section of the separator adapted for the separation or collection of substances that are of less weight than the carrier fluid; Fig. 7 is a vertical section on the line 7—7 of Fig. 6; Fig. 8 is a vertical section of still another form of the apparatus; Fig. 9 is a horizontal section on the line 9—9 of Fig. 8; Fig. 10 is a horizontal section on the line 10—10 of Fig. 8; Fig. 11 is a vertical section of a separator or collector adapted for extensive uses involving high pressure carriers; Fig. 12 is an elevation thereof, partly in section on the line 12—12 of Fig. 11; Fig. 13 is a horizontal section on the line 13—13 of Figs. 11 and 12; Figs. 14 and 15 illustrate still other forms of the apparatus; Fig. 16 illustrates another low-pressure form of the separator and is a sectional view on the line 16—16 of Fig. 17; Fig. 17 is a section on the line 17—17 of Fig. 16; Fig. 18 is a section on the line 18—18 of Fig. 16; Fig. 19 is a horizontal section of a laminating or cellularizing structure of another form which may be substituted for that shown in the lower part of Fig. 16; Fig. 20 is a vertical section of a separator especially adapted for employment with a downgoing carrier stream; Fig. 21 is a vertical section on the line 21—21 of Fig. 20; Fig. 22 illustrates the invention in the form of a purifier adapted for use in steam boilers and the like and is here employed particularly to show that the bottom of the separating chamber need not be a rigid wall but may be formed or closed by any liquid or mobile substance that is heavier than the carrier fluid; Fig. 23 is a longitudinal elevation taken from Fig. 22; and, Fig. 24 illustrates the separator or purifier in a twin or duplex form; and, may be employed as a criterion in converting certain of the preceding designs into duplex forms.

The invention is of a very simple nature although the number of drawings would seem to imply a complicated structure. The simplicity of the invention and the scope and dependability of its operation adapt it for extensive uses in these and many other obvious forms and the invention is not limited or confined to any one of the designs herein appearing; its greater scope will presently become fully apparent and is set forth in the appended claims.

As shown in the drawings the separator or collector in every case comprises a stationary shell or casing, A, which though not required to be actually cylindrical or even scroll-like in any part, is formed about a longitudinal axis (preferably a substantially horizontal axis) and has the effect of a cylindrical chamber or container, B, for a constantly changing mass of carrier fluid which forms a vortex therein, rotating about that axis.

The casing is provided with one or several extensions, A', forming pockets, B', for the reception of the separated substances; and above or below the axis, according to the relative weights of the substances and the carrier. The normally closed drains or openings for the discharge of the accumulations from the several pockets and spaces are marked E and E' (see Fig. 16), being for the heavier and lighter substances respectively.

The burdened carrier, directed by a tube or nozzle, C', in every case enters the shell or casing, A, tangentially through an inlet opening, C, in the periphery of the casing; and, preferably, in a stream of equal or greater width than depth; and, preferably, the width of the stream substantially equals the length of the casing, measured from end to end thereof.

In every case the carrier leaves the casing through an outlet opening, D, also radially positioned; that is, in the periphery of the casing. Preferably each outlet, D, is provided with a tubular extension D'. The extensions D' are formed to serve as a pipe connection, for these separators are perhaps most frequently used under suction conditions. When used under pressure conditions the outlet may discharge to the atmosphere, though quite as often they are connected to delivery pipes.

The direction arrows in the drawings clearly depict the entrance and exit of the fluid. The inlet and the outlet openings are both in the peripheral wall of the casing and also occupy the same transverse planes, and further, are close enough together to form practically a single opening for both the entrance and the exit of the carrier; that is, they are so close together that the kinetic energy of the flowing stream is always sufficient to project the stream and contained substances bodily across or away from the outlet, D, and against the nearest opposed wall or inner surfaces $a^2$ of the casing.

Due to its tangential entrance and the initial velocity of its movement and to the confining and directing walls of the casing, the carrier stream takes on the described, arrow-depicted whirling motion within the chamber, B, and thus a vortex is established and maintained within the casing and extending from end to end thereof axially.

The axial center of the vortex (not always the center of the casing) defines the above-mentioned longitudinal axis. It is in this sense that the terms axis of the casing and axis of the whirl are used herein; for, as will become apparent, the whirl may take place merely in one corner or other part of a larger casing. It is important that the axis of the vortex shall be radially distant from both the inlet and outlet, and aside from the factors that determine the size and cost of the apparatus, less importance attaches to the position of the axis with relation to the other peripheral parts of the casing.

The carrier stream entering the casing obviously has weight and like any mass that is set in motion tends to continue in motion until its kinetic energy is expended in useful work or is dissipated, as in the present instance. Being constantly self-displaced from the restraining periphery of the casing, the carrier stream forms an involute curve or spiral within itself. Obviously the radius of action diminishes and the centrifugal force increases as the axis is approached and thus the initial energy of the entering stream is progressively absorbed; and, the remote parts of the chambers B and B' are left in a virtually undisturbed static pressure condition. In consequence both the centrifugal and the gravity separations of the foreign substances proceed quietly and the substances are quickly brought to rest in respective accumulation spaces of the casing. In brief the burdened stream energetically entering the confining casing is there so directed and manipulated as to deprive the carrier of its velocity pressure and establish, desirably, a mere static pressure condition in the casing, in advance of the movement of the fluid toward the relatively restricted outlet, D.

Meantime and beginning with the impact of the entering stream against the first opposed peripheral wall or surfaces, $a^2$, of the casing, the centrifugal separation of the foreign substances is established by and within the described vortex or whirling carrier mass with the result that such substances are centrifugally ejected or discharged into the accumulation spaces or pockets B'.

The foreign substances that may chance to be retained in the periphery of the whirl or vortex are thereby again presented to the incoming stream and, by the force thereof, are thrown back or re-entrained therein, and thus prevented from reaching the outlet. Obviously, the stray or unseparated substances are presented to the inner side of the incoming stream at a point close to the inlet C where the energy of the stream is the greatest and thus the sure deflection thereof is ensured.

Conveniently, this return of stray substances to the entering stream is usually assisted by a deflecting surface or baffle, F, positioned in the plane or planular curve of the inner side of the entering carrier stream. This baffle or direction plate, F, as shown in the drawings may form one wall of the entrance nozzle C'. It will be found to be of especial value in separators which are employed for removing solids and the heavier particles from lighter carriers.

Though desirable in all cases, the re-entrainment baffle, F, may be omitted and the entering stream alone depended upon to perform that function but usually only at the expense of a measurable loss of efficiency. The omission of the baffle, F, is illustrated in Fig. 14 and a desirable curtailment thereof in Fig. 15. The baffle, F, may be safely omitted from the structure of Fig. 14 and likewise from the structure of Fig. 20 because in those cases the carrier stream flows directly downwardly in the casing and the direct thrust of the stream paralleling the action of gravity may be depended upon to throw back any stray substances that may be whirled into the top of the casing. The curtailed baffles, F, of Figs. 15 and 16 will be found entirely adequate in those cases and further in many cases are employed for the purpose of relatively enlarging or widening the opening or space through which the outgoing carrier fluid may approach the outlet D.

Generally, and as clearly indicated in all the drawings, this novel separator is so constructed as to inhibit the escaping carrier fluid from attaining a defined velocity or direction of movement in advance of its actual arrival at the outlet. Lest this statement be construed too literally, it is explained that the velocity with which the unburdened carrier approaches the outlet should always be very much less than the velocity at which the carrier enters the casing through the inlet C. This relation is brought about very simply by providing the outlet with a wide entrance from the casing. Starting from a substantially static condition, as before explained, the purified or unburdened fluid moves toward the outlet from substantially all parts of the chamber B and so slowly as not to disrupt or interfere with the described separating actions and the outgoing fluid is subjected to a greater or more widely distributed volume of burdened carrier. These are the meanings of the foregoing statement concerning the limitations upon the velocity of the outgoing carrier fluid.

In each of the separators here illustrated the carrier outlet D is so positioned with respect to the inlet C and impact surfaces $a^2$, that the purified or unburdened carrier to reach the outlet must actually penetrate or pass against the burdened incoming stream. That this action may take place without interfering with the described whirling and separating actions and without directly extracting a considerable quantity of foreign substances from the relatively energetic incoming stream is explained first by the presence of the relatively large separating chamber B and second by the correspondingly large capacity of the internal approach to the outlet. As before explained, in initial energy of the stream not only throws or drives the entrained substances across or away from the outlet but is also sufficient to throw back or re-entrain substances seeking to escape from the offset whirl or vortex and it follows that the cross escaping fluid from the interior of the casing must be quite free from impurities by the time it reaches the outlet. And to this is added the displacing or impact energy of the substances suspended in the rapidly entering stream. These strike the stray substances moving toward the outlet and divert them therefrom, and thus ensure their re-entrainment in the burdened stream. By so compelling the escaping fluid to pass through the burdened incoming stream a very effective filtration is accomplished and the highest order of carrier purification is attained. This step of the process will be found to be of marked advantage; always increasing the efficiency of a given separator, and is of particular importance in separating, clarifying or filtering both gaseous and liquid carriers that contain very minute particles of one or several foreign substances, and whether those substances be solids, liquids or gases.

For the reliable accomplishment of the described filtration immediately adjacent the outlet, it is desirable that the entire outlet, D, shall be completely comprehended or covered by the burdened incoming stream, and while the outlet D may be of the same or of greater stream depth than the inlet, it should not be wider than the inlet, and indeed as indicated by the shoulders marked, I, in Figs. 6, 7, and 11 to 24, the outlet should be actually of less width than the stream issuing from the inlet, C. Otherwise, a loss of efficiency may be occasioned by the unfiltered escape of outgoing fluid at the sides of the stream; that is at the unprotected ends of the outlet. Clearly therefore it is the better practice to make the outlet D of less width (longitudinal length) than the inlet, C.

Extremely light substances may be retained in the vortex and rotate many times about the axis until drawn into the center of the vortex; only to be thence discharged by the greatly augmented centrifugal force occasioned by rotation upon the shortest possible radii. In other centrifugal separators the axis of the vortex is found in line with the outlet and the vortex tends to defeat much of the expected action of the separator. By way of contrast the present invention is characterized by an axis of vortexial rotation that is radially removed or offset from the outlet, and the vortexial action instead of being detrimental is made to work beneficially.

By preference the diameter of the casing, or to be more exact, the effective diameter of that portion thereof in which the whirling action occurs, may be made only four to six times the depth (radial measurement) of the incoming carrier stream. The radius of rotation is thus restricted and the volumetric capacity of the separating chamber is made small and thereby the best centrifugal and gravity effects and the most certain withholding of foreign substances from the outlet, are attained. Obviously, when desired the accumulator spaces may be of larger dimensions without detriment to the deposition of the foreign substances once they are freed from the carrier stream.

In harmony with the foregoing; another purpose exists for restricting the volumetric capacity of the separating or vortex chamber; to wit: The smaller the capacity of that chamber, the more rapidly and harmoniously the described separations take place. The reason lies in the discovery that carrier fluids quickly precipitate or relinquish even very minute entrained solids when suddenly super-saturated or over-burdened therewith, quite as moisture is precipitated from air when the air is suddenly cooled; and, this step of enforcing a state of over-saturation, with and without the ordinary limitations of temperature, now becomes available for use in enforcing and ensuring the separation of practically all kinds of substances from carrier fluids of all kinds, not being limited to the separation of solids. Obviously, this separator casing receives the impurities entering with the incoming stream and retains them and so is constantly occupied by a super-saturated or over-burdened carrier mass, which as just explained rapidly releases such substances and permits them to accumulate at the most distant points in the casing. This step of over-burdening, or exceeding of the capacity of the carrier to retain the various substances by surface tension or otherwise, is a distinct feature of the invention; adding a fourth factor or force of separation to the operations of gravity, centrifugal force and final filtration, already mentioned.

It is conceivable that under very low velocities, or when thus cross-entering-and-departing from a casing of unnecessarily large size, the stream may do little more than turn once within or upon itself in the casing. In such cases the effects of centrifugal impact and separation are less to be relied upon but the described gravity separations and the described filtration step will be reliably completed. At all times the outlet is defended by the more energetic entering stream and substances seeking escape with the carrier are re-entrained thereby and again subjected to the separating actions. But although the invention is not limited to the proportions of stream depth and casing diameter which ensure the most rapid and best separating action in the immediate presence of the outlet, it should now be obvious that those proportions are much to be preferred because of the higher efficiencies thereby ensured and because of the attendant large economies in cost, in weight and in space occupied.

The operations above described are the same whether the separator is worked under pressure or under suction, but usually a given separator works with distinguishably higher efficiency when changed from operation under pressure to operation under suction. Apparently the explanation lies in the fact that though not defeating the avoidance or crossing of the outlet by the entering stream, the tendency of suction at the outlet is to shorten the radius of the whirl or vortex within the casing and thus increases the centrifugal efficiency of the device.

As pointed out and specifically claimed in my companion application S. N. 119,165 filed June 28, 1926, this invention may be practiced in more limited ways; for example without the use of the described final filtration step. That particular modification is accomplished by reversing the direction of flow in the two nozzles or direction tubes C' and D' in structures like that shown in Fig. 5. Thereby the outgoing carrier fluid is permitted to escape from the casing at or against the inner side or face of the incoming or active stream but without actually passing through the incoming stream. The benefits of the rapid whirling motion and of re-entrainment are retained and the separator admirably performs its functions in still other respects.

In cases involving vapors that may or should be either liquefied or withheld from condensation, the operation may be favorably affected respectively by cooling or heating the separator. The jacketing, or the spraying of the separator walls internally or externally, to that end, present no mechanical difficulties; and, may be carried out by means so well known and understood that it has been deemed unnecessary to complicate the drawings by attempting to illustrate them. Nevertheless these temperature-affecting steps are definite features of this invention and may well be relied upon as aids in the most difficult separating operations hereunder.

It is well to note that the utility of this invention is not limited to the separation of substances differing widely in specific gravities or to such as are suspended in the carrier in the form of fine particles or small globules. Even gases, oils and bulky materials conveyed by the carrier in the form of sizable particles, globules and flakes on entering the casing are thrust away from or across the outlet opening and even though of substantially the same weight as the carrier fluid, are successfully separated and retained within a respective part of the casing.

Obviously, this invention readily lends itself to grading operations of various kinds, the same being accomplished by the mere provision of a plurality of advantageously situated accumulation bases or pockets. In addition to the removal of the differing collected substances from the bottom, top and corners of the separator casing, a further separation may be made by drawing off the substances that momentarily collect at the center of the described vortex. To this end normally closed central or axial openings or exhaust pipes may be provided in one or both ends of the separator casing as shown at E'' in Figs. 11 and 12. The location or collection points of the various foreign substances at the bottom or at the top of the casing is obviously determined by the differing natures of the substances in relation to the carrier; and, in some cases by the promptness with which the separated substances are removed from the most advantageous point of accumulation or assembly within the casing.

Clearly, this invention is adapted for employment with hot and cold carrier fluids under both suction and pressure conditions and at either high or low pressures and under either high or low velocities; and with either heavier or lighter or fluctuating burdens of foreign substances. Also that according to the nature or characteristics of the substances caught, the vessel or casing may be upright or upside down or on its side or end. Also the pocketing, that is the reception and disposal of the separated substances may be accomplished in any manner best suited to the case in hand, without altering the essential operations within the casing. As indicated, the casings may be of various shapes and axial positions, as best suited to particular conditions and uses and the unified inlet and outlet openings, and the discharge openings for the foreign substances, may be arranged in the top, bottom, sides, or ends of the casing depending upon the nature of the separating acts to be performed.

A fluid body set in rotation within a casing as here described tends to rotate upon an axis that is spaced between the most nearly adjacent opposed peripheral walls or directing surfaces and although in the space immediately adjacent the inlet-outlet is thus occupied by a vigorously whirling mass and is in direct, wide open communication with the accumulation spaces, the latter are substantially quiescent, little affected by such rotation, and the separated substances quietly move toward and remain quite undisturbed in such spaces, until drained or otherwise emptied therefrom. Even though the separator is crudely constructed no difficulty is experienced with foreign substances that are either very heavy or very light with respect to the carrier acted upon. But in dealing with more difficultly separable fluids and substances, possible escape through the outlet must be very definitely prevented; and, this is accomplished by closely localizing the described vortex at, and in parallel with, the inlet-outlet openings as above described. Further to insure this close localization of the vortex it is best to closely control the size and position thereof within the casing, which last is accomplished by restricting the effective diameter of that part of the casing, as above explained; and, in some cases by special formations of the peripheral walls and where necessary by the use of intermediate parts in the opening between the spaces B and B'. The purpose of all such is to definitely prevent any detrimental distortion or dissipation of the vortex that would cause or permit the dislodgement of the deposited substances in the accumulation spaces. As shown in Figs. 8, 14, 22 and 24, the component walls of the vortex portion of the casing will alone fully serve this purpose and no added parts are required. Again when the separator is used under suction there is little danger of disturbance in the accumulation spaces even when the carrier moves at very high velocities. But as any given separator is likely to be used with high velocity and heavy carrier fluids, which if uncontrolled would be likely to penetrate and disturb the contents of the accumulation spaces, it is recommended that in all separator designs, as here shown, care to be taken to control and limit the vigorous action of the vortex to a substantially cylindrical body of small diameter in that part of the casing immediately adjacent the inlet-outlet. Hence the formations alluded to in Figs. 8, 14, 22 and 24. And where the opening between the spaces B and B' is wide and otherwise uncontrolled the use of vortex limiting members, G, is recommended. Such parts G appear in Figs. 1 to 7, 15 to 18, 20 and 21. The part G' appearing in Figs. 11 and 12 is a modification thereof, intended to perform the same function. However, a further function attaches to the construction comprising the parallel blades or vanes G. The latter are spaced apart and not so close as to form a grating which would clog with separated substances, and not only provide vortex controlling surfaces at the margin of the space B, but also divide the communication space or opening between the space or spaces B and B' into a number of narrow laminations or cells in which the stray rotating or eddy currents from the periphery of the vortex are taken up and dissipated; thus, further ensuring the quietness of the settling or accumulation spaces B'. The operation of the plate-like longitudinal member G', appearing in Figs. 11 and 12, is like that of any other wall of the chamber B. The dotted lines forming the rectangles in the space B of Fig. 11 are intended to represent the normal angles of incidents upon which the currents and particles impinge and leave the several surfaces and well illustrate the manner in which the carrier stream is forced to take on the involute whirl above described.

The time or duration of the occupancy of the vortex chamber by any given portion of carrier fluid is so short as to be necessarily only a mentally comprehended period. However, the effects of the whirl and the whirling currents as made visible by the conveyed substances may be clearly observed if the end of the casing is made transparent. It will be found that they take place as above described.

As before stated, given a predetermined stream depth at the inlet of the separator it is desirable to relatively minimize the vortex chamber and, reversely, it will be found advantageous to relatively limit the entering stream depth and the corresponding dimension of the outlet so that the vortex chamber may be so restricted in diameter; to the end that the given separator shall be equal to good operation with a variety of carriers and under conditions varying from partial vacuums to high pressures.

In contrast, there is no real limitation upon the longitudinal dimension of the separator. In other words, it may be made as long as necessary to afford the requisite capacity or area in the inlet and outlet openings. These facts are well contrasted in Figs. 2 and 3; also a contrast in the shapes of the inlet openings. The inlet opening, C, of Fig. 2 is round and the longitudinal dimension of the casing is best determined by the width of that opening; the parts $x^3$ in Fig. 2, represent the end walls of the casing. The inlet openings, C, of Fig. 3, are rectangular. That is, the opening as a whole is rectangular and, in addition, is divided into a number of smaller rectangular openings by a plurality of vertical walls or divisions H'.

The internal walls, H, occupy the body of the casing and in each case serve to divide the vortex space, B, into many transverse parallel compartments. Such lamination or sub-division of the vortex space by the plates or walls H, (see Figs. 3, 6, 7, 16 to 18 and 20 to 23) serves to confine each part of the entering stream to rotation between those transverse planes which are comprehended by that part of the inlet opening, C, through which it enters. In other words, the walls or laminations, H, serve to minimize any detrimental effects from inequalities in the entering or burdened carrier stream and to suppress the longitudinal dispersion of particles or substances that might be permitted to impact the walls at angles that would cause their deflection into or toward the outlet.

Further, the laminations or plates, H, afford such large frictional surfaces as to measurably resist the incoming stream, thus aiding in the absorption of its energy and hastening the quiet separation of the foreign substances.

Fig. 19 is referred to at this point lest the plate, G and $G^a$, there shown, be confused with the laminating plates H. While the plates H, might safely be connected in line with the axis of rotation in the space, B, they can not be connected by cross plates after the manner shown in Fig. 19. This should be obvious for it is clear that the spaces between the plates, H, must be free and permit the uninterrupted rotation of the carrier fluid. Fig. 19 refers to the structure by which the radial expansion of the vortex is limited, being made up of plates or veins, G, and Fig. 19 merely shows that the cells formed by such plates may advantageously be subdivided by the use of transverse bracing parts or blades, $G^a$. Such subdivision always favorably increases the braking action upon the carrier currrents at that point and is particularly desirable in separators of the larger sizes, in which the long blades, G, should be supported or braced at one or several intermediate points.

Each of the separators herein shown has further special advantages which it is believed will be apparent to those skilled in the art and therefore seem not to require detailed description herein, such advantages being inherent. However, the following matters seem to warrant special mention.

For some uses structures like that shown in Fig. 4 have an advantage over those of Figs. 1 and 5, in that the wall $a^4$ (Fig. 4) presents an abutment against which the foreign substances are thrown by the stream and stopped, leaving them to fall into the accumulation space without danger of re-entrainment in the vortex. A like condition is presented by the angularly ribbed or stepped wall $a^5$, in the structure of Fig. 15, though that wall is curved. Similarly, the advantage of the abutment is preserved in the structure of Fig. 16.

The structure of Figs. 6 and 7 is primarily intended for the separation of gases, oils, and the like, from heavier carrier liquids. The space $B^2$ at the top receives the gases, which are discharged through the normally closed pipe $2^E$. The oils and other floating substances are drained off through the normally closed pipe $3^E$. The separator of Figs. 6 and 7 is preferably formed of cast metal parts and will be clearly understood from those drawings.

The separator of Figs. 8 to 10, well illustrates the before-mentioned fact that the accumulation spaces may be of such greater size than the vortex space of the separator. It also shows that the invention comprehends the direct upward delivery of the burdened stream, coupled with the lateral off-take of the purified fluid. The drawings very clearly represent a typical structure.

The structure of Figs. 11, 12 and 13, illustrates the substantially cylindrical construction of the separating head. It is substantially rectangular in horizontal cross section and yet fits upon a cylindrical collection pocket A'. The structure admirably serves a variety of uses and is extremely compact, very simple and strong.

The separators of Figs. 14 and 15 may be used in citing the fact that, by preference, the outer wall or margin of the intake opening C, is offset inwardly from the outlet; That is, toward the axis of the vortex and with respect to the outlet opening D. This is a feature generally observed herein as a precaution against the too sudden expansion of the incoming stream and the impingement of the outer or upper strata thereof against the opposed wall of the outlet opening.

It will be understood that the separating heads of Figs. 14 and 15, like that of Fig. 12, are substantially rectangular in horizontal cross section. Obviously, the ends of the separating chambers B, might be bulged outwardly, but the effect would be negative, and so far as the strength of those parts is concerned that may better be cared for by ribbing them as shown in Figs. 12 and 13.

The separators of Figs. 16 to 21 are particularly adapted for use in the collection of dusts and seem to be sufficiently described except in the matter of reference to the special accumulation spaces marked $B^x$ in Fig. 16 and $B^y$ in Fig. 20. These spaces receive substances that are actually floatable and, therefore, not capable of settlement in the lower collection spaces. Similar, but more strongly built, structures are used in the filtration of liquids, in which cases these entrapped accumulation spaces are of particular value for the drawing off of floatable substances.

The separator of Figs. 22 and 23, shown as employed in an evaporating vessel 2, is of peculiar simplicity and of high efficiency. Although as indicated in Fig. 24 the separator of Fig. 22 may be provided with a fixed bottom and properly drained collection bowl, it is preferably formed as an open tube which descends into the boiling liquid 3, contained in the vessel 2. The liquid is thus made to form the bottom of the separating space B', and directly receives the substances ejected or separated by the described action within the upper part of the casing A. For the sake of convenience the lower part of the casing, that forming the tubular extension, is made separable from the upper part, which is rigidly attached to the shell of the vessel 2, at the outlet nozzle 2' thereof.

Various other constructions may be employed in carrying out this invention and desiring to claim them separately or specifically I have made them the subjects of divisional applications; as follows:—

Co-pending application S. N. 119,413 filed June 29, 1926, discloses a separator wherein the inlet and outlet openings for the carrier are positioned almost at the top of a larger separating chamber which surrounds the openings, the latter being formed by the upper ends of riser pipes or ducts, one within the other. Said application also discloses certain modifications closely resembling the structure shown in Fig. 8 hereof.

Co-pending application S. N. 119,414 filed June 29, 1926, discloses a modification hereof in which the outlet or exit opening is further removed from the actual inlet opening to the separator and yet is so disposed as to be "defended" by the rapid downward whirl of the burdened stream before it.

Co-pending application S. N. 119,415 filed June 29, 1926, discloses a structure in which the carrier fluid enters downward into a collecting chamber and centrally within a larger outlet leading upward from said chamber coupled with means that cause the herein described reverse involution of the incoming stream with much the same effect as herein described.

And divisional application S. N. 119,416 filed June 29, 1926, discloses a structure comprising a separating chamber or cylinder which the carrier streams again enter and leave in planes that parallel the axis of rotation but differing from the disclosures of this application in that the axis of the vortex is vertical instead of horizontal.

Having thus described my invention I claim as new and desire to secure by Letters Patent:—

1. The herein described process of unburdening carrier fluids, that consists in establishing the flow of the carrier and at one point a vortex thereof upon an axis transverse to the direction of the flow, maintaining said vortex by feeding the burdened carrier tangentially thereto, and, separately discharging both the unburdened carrier and the separated substances outward from the periphery of said vortex and in the transverse plane including the tangential feed, substantially as described.

2. The herein described process of unburdening carrier fluids, that consists in establishing the flow of the carrier and at one point a vortex thereof upon an axis transverse to the direction of the flow, maintaining said vortex by feeding the burdened carrier tangentially thereto, discharging the separated substances outward from the periphery of said vortex and in the transverse plane including the tangential feed, and separately releasing the unburdened carrier radially from said vortex, substantially as described.

3. The herein described process of unburdening carrier fluids, that consists in establishing the flow of the carrier and at one point a vortex thereof upon an axis transverse to the direction of the flow, maintaining said vortex by feeding the burdened carrier tangentially thereto, discharging the separated substances outward from the periphery of said vortex, and separately releasing the unburdened carrier radially from said vortex and through the tangentially entering carrier stream, substantially as described.

4. The herein described process of unburdening carrier fluids, that consists in establishing the flow of the carrier and at one point a vortex thereof upon an axis transverse to the direction of the flow, maintaining said vortex by feeding the burdened carrier tangentially thereto, retaining the foreign substances in the region of the vortex to the point of over-burdening the carrier fluid with foreign substances, and, separately discharging the separated substances and the unburdened carrier in the transverse plane including the tangential feed.

5. The herein described process of unburdening carrier fluids, that consists in establishing the flow of the carrier and at one point a vortex thereof upon an axis transverse to the direction of the flow, maintaining said vortex by feeding the burdened carrier tangentially thereto, retaining the foreign substances in the region of the vortex to the point of overburdening the carrier fluid with foreign substances, and, separately discharging the separated substances and the unburdened carrier radially from said vortex and in the transverse plane including the tangential feed.

6. The herein described process of unburdening carrier fluids, that consists in establishing the flow of the carrier and at one point a vortex thereof upon an axis transverse to the direction of the flow, maintaining said vortex by feeding the burdened carrier tangentially thereto, varying the temperature of the carrier in the region of said vortex, and, separately discharging both the unburdened carrier and the separated substances outward from the periphery of said vortex, substantially as described.

7. The herein described process of unburdening carrier fluids, that consists in establishing the flow of the carrier and at one point a vortex thereof upon an axis transverse to the direction of the flow, maintaining said vortex by feeding the burdened carrier tangentially thereto, varying the temperature of the carrier in the region of said vortex, discharging or releasing the unburdened carrier radially outward through the entering carrier stream, and separately discharging the foreign substances from and to points beyond the periphery of said vortex, substantially as described.

8. The herein described process of unburdening carrier fluids, that consists in establishing the flow of the carrier and at one point a vortex thereof upon an axis transverse to the direction of the flow, maintaining said vortex, by feeding the burdened carrier tangentially thereto, varying the temperature of the carrier in the region of said vortex, and, separately discharging both the unburdened carrier and the separated substances outward from the periphery of said vortex, substantially as described.

9. The herein described process of unburdening carrier fluids that consists in forcibly directing a stream of burdened carrier into a separating chamber, and, releasing and filtering the unburdened carrier by causing the same to pass outward through the most forcible portion of the stream of burdened carrier.

10. The herein described process of unburdening carrier fluids that consists in directing a stream of burdened carrier into a separating chamber, and, releasing and filtering the unburdened carrier by causing the same to pass outward through the stream of burdened carrier, and in the form of a stream of less width.

11. The herein described process of unburdening carrier fluids that consists in projecting the burdened carrier into a closed chamber, therein separating the foreign substances, and maintaining a condition of super-saturation that hastens such separation.

12. The herein described separator for use in unburdening carrier fluids, comprising in combination a casing that contains a separating chamber and an accumulation space, said chamber having a tangential inlet for the burdened carrier and a peripheral outlet for the unburdened carrier, said inlet and outlet being in the same plane, and said space having an opening for the discharge of the separated foreign substances.

13. The herein described separator for use in unburdening carrier fluids, comprising in combination a casing that contains a separating chamber and an accumulation space, said chamber having a tangential inlet for the burdened carrier and a peripheral outlet for the unburdened carrier, said inlet and outlet being in the same plane and so close together as to form in effect a single opening for the entrance and exit of the carrier, and the said space being adapted for the discharge of the separated foreign substances.

14. The herein described separator for use in unburdening carrier fluids, comprising in combination a casing that contains a separating chamber and an accumulation space, said chamber having a tangential inlet for the burdened carrier and a peripheral outlet for the unburdened carrier, said inlet and outlet being in the same plane and so related that the outgoing carrier in order to reach the outlet must first pass through the incoming burdened carrier stream and the said space having means for the discharge of the separated foreign substances.

15. The herein described separator for use in unburdening carrier fluids, comprising in combination a casing that contains an effectively cylindrical vortex chamber and an accumulation space, said chamber having a tangential inlet for the burdened carrier and also a peripheral outlet for the unburdened carrier, said inlet and outlet being in the same plane, and, the said space having means for the discharge of the separated foreign substances.

16. The herein described separator for use in unburdening carrier fluids, comprising in combination a casing that contains an effectively cylindrical vortex chamber and an accumulation space, said chamber having a tangential inlet for the burdened carrier and also peripheral outlet for the unburdened carrier, said inlet and outlet being in the same plane, vortex controlling means positioned between said chamber and space, and, said space having means for the discharge of the separated foreign substances.

17. The herein described separator for use in unburdening carrier fluids, comprising in combination a casing that contains an effectively cylindrical vortex chamber and an accumulation space, said chamber having a tangential inlet for the burdened carrier and also a peripheral outlet for the unburdened carrier, said inlet and outlet being in the same plane, and the latter being narrower than the former, vortex controlling means positioned between said chamber and space, and, said space having means for the discharge of the separated foreign substances.

18. The herein described separator for use in unburdening carrier fluids, comprising in combination a casing that contains an effectively cylindrical vortex chamber and an accumulation space, said chamber having a tangential inlet for the burdened carrier and a peripheral outlet for the unburdened carrier, longitudinally disposed vortex-defining-and-energy-absorbing blades positioned between said chamber and space, and, said space having means for the discharge of the separated foreign substances.

19. The herein described separator for use in unburdening carrier fluids, comprising in combination a casing that contains an effectively cylindrical vortex chamber and an accumulation space, said chamber having a tangential inlet for the burdened carrier and a peripheral outlet for the unburdened carrier, said inlet and outlet being in the same plane, longitudinally disposed vortex-defining-and-energy-absorbing blades positioned between said chamber and space, and, said space having means for the discharge of the separated foreign substances.

20. The herein described separator for use in unburdening carrier fluids, comprising in combination a casing that contains an effectively cylindrical vortex chamber and an accumulation space, said chamber having a tangential inlet for the burdened carrier and a peripheral outlet for the unburdened carrier, said inlet and outlet being in the same plane and so disposed that to escape through the outlet the carrier must pass said inlet, and, said space having an opening for the discharge of the separated foreign substances.

21. The herein described separator for use in unburdening carrier fluids, comprising in combination a casing that contains an effectively cylindrical vortex chamber and an accumulation space, said chamber having a tangential inlet for the burdened carrier and an immediately adjacent and narrower peripheral outlet for the unburdened carrier, said inlet and outlet being in the same plane, and, said space having means for the discharge of the separated foreign substances.

22. The herein described separator for use in unburdening carrier fluids, comprising in combination a casing that contains an effectively cylindrical separating chamber and an accumulation space, said chamber having in the same transverse plane a tangential inlet for the burdened carrier and a peripheral outlet for the unburdened carrier, laminating plates positioned in said chamber in a plane transverse to the axis thereof, and, said space having means for the discharge of the separated foreign substances.

23. The herein described separator for use in unburdening carrier fluids, comprising in combination a casing that contains an effectively cylindrical separating chamber and an accumulation space, said chamber having in the same transverse plane a tangential inlet for the burdened carrier and a peripheral outlet for the unburdened carrier, a plurality of longitudinally spaced laminating plates positioned in said chamber upon planes transverse to the axis of said chamber, and said space having means for the discharge of the separated foreign substances.

24. The herein described separator for use in unburdening carrier fluids, comprising in combination a casing that contains an effectively cylindrical vortex chamber and an accumulation space, vortex defining means positioned between the same, said chamber having a tangential inlet for the burdened carrier and a peripheral outlet for the unburdened carrier, said inlet and outlet being in a plane transverse to the axis of said chamber, a laminating plate transversely positioned in said chamber, and, said space having means for the discharge of the separated foreign substances.

25. The herein described separator for use in unburdening carrier fluids, comprising in combination a casing that contains an effectively cylindrical vortex chamber and an accumulation space, said chamber having in the same transverse plane a tangential inlet for the burdened carrier and a peripheral outlet for the unburdened carrier and presenting an impact surface opposite said inlet and relatively beyond said outlet and said space having means for the discharge of the separated foreign substances.

26. The herein described separating and filtering bend for separators comprising in combination inlet and outlet nozzles in the same plane and presenting at their adjoining ends relatively offset inlet and outlet openings.

27. The herein described separating and filtering bend for separators comprising in combination inlet and outlet nozzles in the same plane and presenting at their adjoining ends relatively offset inlet and outlet openings, and a deflecting impact member relatively beyond said outlet.

28. The herein described separating and filtering bend for separators comprising in combination inlet and outlet nozzles in the same plane and presenting at their adjoining ends relatively offset inlet and outlet openings, a deflecting impact member relatively beyond said outlet, and said outlet opening being narrower than said inlet opening.

29. The herein described separator for use in unburdening carrier fluids, comprising in combination a casing that contains a separating chamber and an accumulation space, the first having a tangential inlet for the burdened carrier and a peripheral outlet for the unburdened carrier and also containing a re-entraining baffle positioned at the inner side of said inlet, and the second having an opening for the discharge of the separated foreign substances.

30. The herein described separator for use in unburdening carrier fluids, comprising in combination a casing that contains a separating chamber and an accumulation space, said chamber having a tangential inlet for the burdened carrier and a peripheral outlet for the unburdened carrier and also containing a re-entraining baffle positioned at the inner side of said inlet, said inlet, said outlet and said baffle being in the same plane and so related that the outgoing carrier in order to reach the outlet must first pass through the incoming burdened carrier stream, and, the said accumulation space having means for the discharge of the separated foreign substances.

31. The herein described separator for use in unburdening carrier fluids, comprising in combination a casing that contains an effectively cylindrical vortex chamber and an accumulation space, said chamber having a tangential inlet for the burdened carrier and also a peripheral outlet for the unburdened carrier, and also containing a re-entrainment baffle positioned at the inner side of said inlet, vortex controlling means positioned between said vortex chamber and said accumulation space, and, said space having means for the discharge of the separated foreign substances.

32. The herein described separator for use in unburdening carrier fluids, comprising in combination a casing that contains an effectively cylindrical separating chamber and an accumulation space, said chamber having in the same transverse plane a tangential inlet for the burdened carrier, a re-entrainment baffle, and a peripheral outlet for the unburdened carrier, a plurality of longitudinally spaced laminating plates positioned in said chamber upon planes transverse to the axis of said chamber, and said space having means for the discharge of the separated foreign substances.

33. The herein described separator for use in unburdening carrier fluids, comprising in combination a casing that contains an effectively cylindrical vortex chamber and an accumulation space, vortex defining means positioned between the same, said chamber having a tangential inlet for the burdened carrier and a peripheral outlet for the unburdened carrier, a re-entrainment baffle positioned in the vortex chamber and at the inner side of said inlet, said inlet and outlet being in a plane transverse to the axis of said chamber, a laminating plate transversely positioned in said chamber, and, said space having means for the discharge of the separated foreign substances.

34. The herein described separator for use in unburdening carrier fluids, comprising in combination a casing that contains an effectively cylindrical vortex chamber and an accumulation space, said chamber having in the same transverse plane a tangential inlet for the burdened carrier, a re-entrainment baffle, and a peripheral outlet for the unburdened carrier and presenting an impact surface opposite said inlet and relatively beyond said outlet and said space having means for the discharge of the separated foreign substances.

In testimony whereof I have hereunto set my hand this 26th day of June, A. D. 1926.

CHARLES GILBERT HAVLEY.